United States Patent Office 3,391,275
Patented July 2, 1968

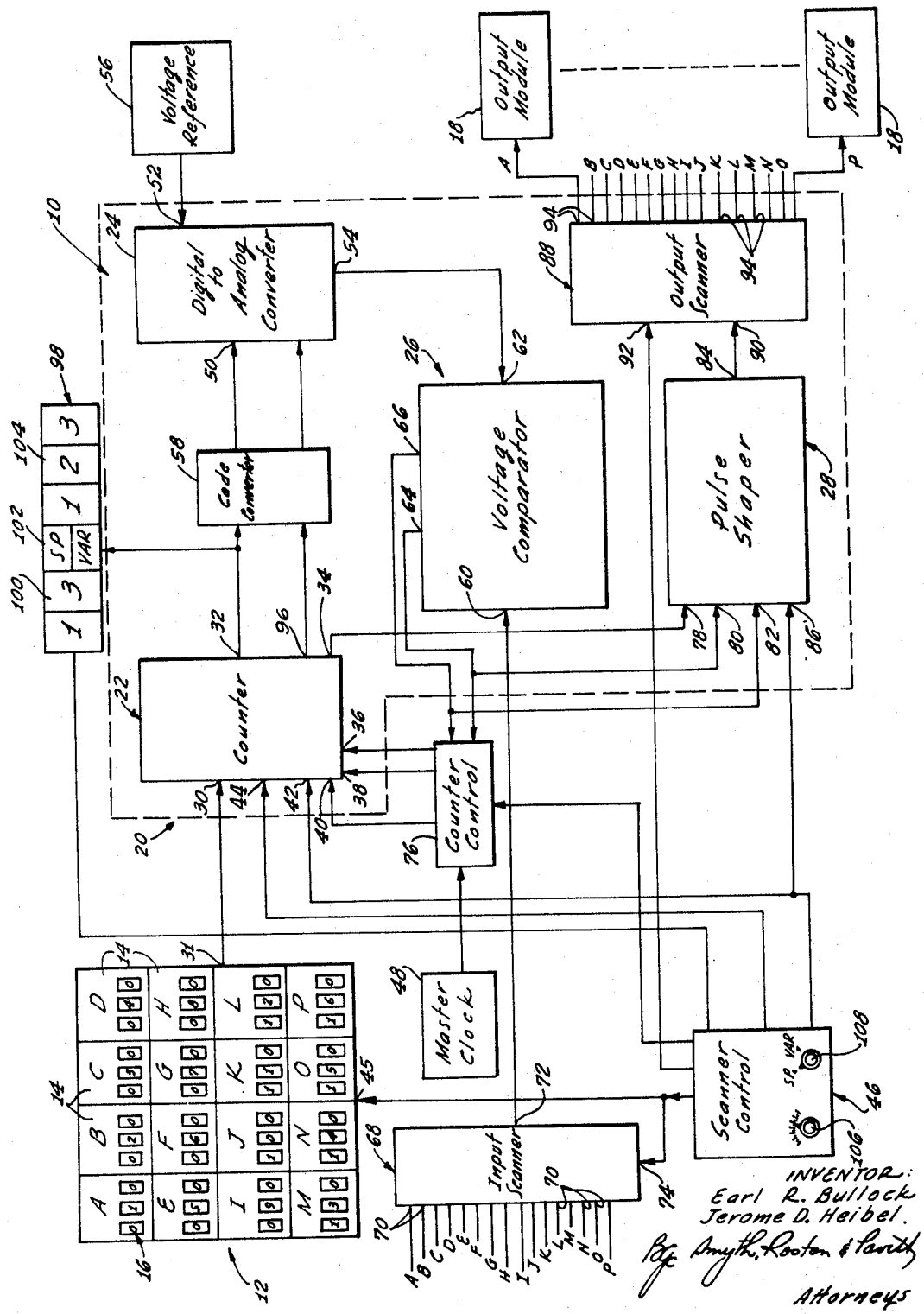

3,391,275
APPARATUS FOR REGULATING A VARIABLE OUTPUT IN ACCORDANCE WITH A REFERENCE VALUE
Earl R. Bullock and Jerome D. Heibel, Palos Verdes Estates, Calif., assignors to Minnesota Mining and Manufacturing Company, St. Paul, Minn., a corporation of Delaware
Filed Oct. 11, 1963, Ser. No. 315,459
15 Claims. (Cl. 235—151.1)

ABSTRACT OF THE DISCLOSURE

This invention relates to a system for regulating a variable output in accordance with a reference value. The system includes a counter which initially provides an indication of the reference value and which adds or subtracts particular increments from the reference value in accordance with the output from a comparator. The variable output and the output from the counter are introduced to the comparator which produces a difference signal in accordance with such comparison. This difference signal is introduced to the counter to cause the counter to add or subtract an increment in accordance with the characteristics of the difference signal. The difference signal is also introduced to the variable output to vary the output in accordance with the characteristics of the difference signal.

---

The present invention relates to means for providing an error signal, and more particularly to means for regulating the magnitude of one or more variables.

It is very frequently desirable to be able to automatically regulate the magnitude of one or more variable functions. Heretofore, this has been accomplished by providing a pickup or similar device which is effective to produce a signal having a magnitude that corresponds to the instantaneous magnitude of the variable to be controlled. In addition, control means are provided for each of the variables that will be effective to regulate the magnitude of the respective variable. A servo control system is then provided which is effective to regulate the control means so that the variable will be adjusted to insure that the signal from the pickup is maintained at some predetermined level. Although such means have been effective to regulate the one or more variables so that their magnitudes are of the desired amount, they have been extremely complex and expensive to manufacture and use and/or they have been unable to regulate the magnitudes of the variables within a sufficiently close tolerance.

Means have now been provided which will overcome the foregoing difficulties. More particularly, means have been provided which are simple and inexpensive to manufacture and use and are effective to control a large number of variables to within a very small tolerance. More particularly, a control system is provided which includes means effective to produce a digital reference signal, a digital counter which is adapted to receive the digital reference signal, an analog comparator which is effective to compare the magnitude of an analog signal from the variable with the magnitude of the output signal from the counter. In addition, means are provided which will cause the counter to count from the reference signal to a signal that will have a magnitude corresponding to the magnitude of the signal representing the variable. As the counter counts from the reference signal to a signal equal to the variable signal, it will produce an error signal which will have a magnitude corresponding to the amount of error originally present between the reference and variable signals. This error signal will then be effective to actuate a control means which will adjust the variable so as to eliminate the error signal.

These and other features and advantages of the present invention will become readily apparent from the following detailed description of one embodiment thereof, particularly when taken in connection with the accompanying drawing of:

A block diagram showing a control system embodying one form of the present invention.

The present invention is particularly adapted to be embodied in a system 10 for simultaneously monitoring and/or regulating each of the various functions in a process having a large number of interrelated continuously variable functions. Although the system 10 may be constructed and arranged to monitor and/or regulate any desired number of functions, in the present instance it is shown as being capable of monitoring and regulating up to sixteen separate functions. A separate channel is provided for each of the functions with the channels being designated A through P, inclusive.

Each of the channels includes an individual pickup that is responsive to the magnitude of the function that it monitors and/or regulates. Each pickup, in turn, includes a transducer positioned in intimate relation with the function so as to be responsive to the magnitude thereof. The transducer will be effective to produce an analog signal having an amplitude that is proportional to the magnitude of the function.

It may be seen that the input portion of each of the separate channels A to P will contain an analog signal having an instantaneous amplitude proportional to the instantaneous magnitude that the corresponding function actually has at any particular instant.

A control panel 12 may be provided that includes a separate control unit 14A to 14P, inclusive, for each of the separate channels A to P, inclusive. Each of these control units 14 includes one or more dials 16 that may be manually adjusted. The dials 16 will normally be set so that the reading displayed by the dial 16 equals the magnitude which that particular function should have. Each of the control units 14 will be effective when actuated to produce a set point signal corresponding to the setting on its dial 16. Although these set points signals may be of any desired variety, in the present instance, they are so-called digital signals consisting of a group of binary coded voltage levels representing the desired magnitude.

In order to control the actual magnitude of the functions, a separate output module 18 is provided for each of the channels A to P. Each of these modules 18 includes an input for receiving an error signal. The module 18, in turn, includes an output that may directly regulate the function. However, in the present instance, the output provides a control signal that will actuate a regular effective to control the magnitude of the function. By way of example, the output modules may be similar to those disclosed and claimed in copending application entitled, "Converter," Ser. No. 310,227, filed Sept. 20, 1963 (now Patent 3,290,673 issued Dec. 6, 1966) in the name of Earl R. Bullock and assigned of record to Minnesota Mining and Manufacturing Company. Although any suitable output modules may be used, the modules disclosed in Patent 3,290,673 are advantageous because they are able to retain information for long periods of time without producing any variations in such information.

In addition, the present system 10 includes a command section 20 which has an input for receiving the analog signals from the pickups representing the actual values of the functions, an input for receiving the digital set point signals from the control panel 12 representing the desired values of the functions and an output for providing analog error signals to the output modules 18 for controlling their operation. It may thus be seen that the command section 20 will be effective to match each of the set point signals with the corresponding function signal and then feed an error signal to the output module so as to modify the function until the set point signal and function signal are equal and the error signal disappears.

The present command section 20 includes a counter 22, a code converter 54, a signal converter 24, a signal comparator 26, a pulse shaper 28 and an output scanner 88. The counter 22 which may be of a conventional design includes a signal input 30, a pair of signal outputs 32 and 34 and a plurality of control inputs 36, 38, 40, 42 and 44. The counter 22 is adapted to receive signals on the input 30 and add counts to the input signal if an add signal is present on the add input 36. The rate at which the counts are added is controlled by the input 40. The input 40 is adapted to receive a series of clock pulses so that a count will be added each time that a clock pulse occurs. A subtract signal present on the subtract input 38 will be effective to produce the opposite whereby a count will be subtracted each time that a clock pulse occurs on input 40.

Each time that a count is being added or is being subtracted, a pulse will be produced on the output 34. It will thus be seen that a series of pulse trains will be produced that include pulses having the same frequency as the clock pulses at the input 40 and a number equal to the number added or subtracted.

The input 42 is effective to receive a reset signal that will clear the entire counter 22 to zero while the input 44 is effective to receive a set signal that will cause the signal on the input 30 to be transferred into the counter 22.

The signal input 30 is interconnected with the output 31 from the control panel 12 so as to receive the set point signals developed within each of the control units 14. In order to permit the control system 10 to employ a single command section 20 while monitoring and/or regulating the various functions contained in a large number of channels, time-sharing multiplexing is employed in the present embodiment. Accordingly, a scanner may be provided in the control panel 12 for sequentially interconnecting each of the control units 14 with the input 30. As a result, the input 30 will receive a sequence of set point signals that correspond to the set points for the respective channels. A scanner control 46 may be interconnected with an input 45 to the set point scanner in the control panel 12 so as to control the sequence in which the various control units 14A to 14P are switched to the input 30 and the time duration of the interconnection.

Although the set point signals may be of any desired form, as will become apparent subsequently, it is desirable for each set point signal to be in a digital form. That is, each of the set point signals will include a group of coded voltage levels that correspond to the desired magnitudes of the functions represented by the channels A to P. In the event that there is not an add signal present on the input 36 or a subtract signal present on the input 38, the signal on the output 32 will be a digital signal identical to the set point signal present on the input 30. However, in the event there is an add signal present on the add input 36, the counter will be effective to add one unit to the set point signal each time a clock pulse is applied to the input 40. As a consequence, the signals present on the output 32 will consist of a sequence of digital signals. The signals will be occurring at the same frequency as the clock pulses applied to the input and each of the signals in the sequence will be one unit larger than the preceding signal. At the same time, a pulse train will be produced on the output 34 that will have a number of pulses that are equal to the number of units added to the set point signal present on the input 30.

In the event there is a subtract signal present on the second control input 38, the counter 22 will be effective to subtract one unit from the set point signal on the input 30 each time a clock pulse is applied to the input 40. Under these conditions, the signals present on the output 32 from the counter 22 will be a sequence of digital signals that occur at the same frequency as the clock pulses on input 40. Each of the signals in the sequence will be one unit less than the preceding signal in the sequence.

The clock pulses may be derived from any suitable source such as a master clock 48. The clock 48 may be of any conventional design capable of producing a series of clock pulses at a predetermined fixed frequency. Although the precise frequency of the clock is not critical, it has been found that a clock rate of about one hundred kilocycles per second is well suited for the present applications.

The present signal converter 24 includes a signal input 50 for receiving incoming signals, a reference input 52 for receiving a standard or reference signal from a voltage reference 56, and an output 54 for providing an output signal. The converter 24 may be of any conventional design suitable for converting a digital signal present on the input 50 to an analog signal on the output 54. The output signal will thus have an amplitude that is proportional to the magnitude of the digital signal. In order to insure a precisely accurate conversion from digital into an analog, the amplitude of the output signal may be correlated with the amplitude of the voltage present on the reference input 52. It may thus be seen that by employing a reference 56 that can maintain a stable reference voltage, the conversion will be correspondingly accurate.

The input 52 to the converter 24 is interconnected with the output 32 of the counter 22 so as to receive the sequence of digital signals having progressively increasing or decreasing magnitudes. The converter 24 will thus be effective to convert each of the signals in the sequence into a corresponding analog signal. It may be seen that the signal on the output 54 will be a "stair step" signal that moves up or down by one unit at the clock rate.

In order to simplify the construction of the converter 24 and its operation, as is well known in the art it may be desirable to provide a code converter 58 between the output 32 of the counter 22 and the input 50 to the digital-to-analog converter 24. The code converter 58 will be effective to change the code employed in the digital signal from the counter 22 into a code that will be easier to convert from digital to analog.

The voltage comparator 26 has a pair of inputs 60 and 62 and a pair of outputs 64 and 66. The comparator 26 which may be of a conventional design is effective to compare the amplitudes of the two signals present on the two inputs 60 and 62 with each other and provide a signal on one of the outputs 64 or 66 to indicate which of the two inputs 60 and 62 are highest. The difference signal will be alternatively present on one or the other of the outputs 64 or 66 depending on whether the signal or input 60 is respectively higher or lower than the signal on input 62.

More particularly, if the signal present on the first input 60 is higher than the signal present on the second input 62, a signal will be produced only on the first output 64. Output 66 will not have a signal thereon under these conditions.

The second input 62 to the comparator 26 is connected to the output 54 from the D-to-A converter 24. As a consequence, this input 62 will receive an analog signal having an amplitude initially corresponding to the magnitude of the digital set point signal. However, the amplitude of this signal will increase or decrease from this level in a series of predictable steps. This voltage may thus be considered as a known analog voltage signal.

The first input 60 to the comparator 26 is connected to the transducer in the pickup. As a consequence, this input 60 will receive an analog signal having an amplitude corresponding to the amplitude that the function has at that particular instant.

As previously stated, the present system employs time-sharing multiplex. Accordingly, the input 60 to the comparator 26 may be interconnected with the various pickups by means of an input scanner 68. The present scanner 68 employs a separate input 70A to 70P for each of the channels A to P. Each of the inputs 70 is continuously connected directly with the transducers in the pickup. As a consequence, each input will continuously receive an analog signal having an instantaneous amplitude proportional to the instantaneous magnitude of its respective function.

The scanner 68 also includes a single output 72 and a control input 74. The control input 74 is effective when control signals are fed thereto to switch the scanner 68 so that only one of the inputs 70A to 70P at a time will be connected to the output 72. The control input 74 is interconnected with the output of the scanner control 46. This will be effective to insure both the scanner in the control panel 14 and the input scanner 68 synchronously switching signals for the same channels to the outputs 31 and 72. Thus, the digital set point signal on the output 31 will always correspond to the analog function signal present on the scanner output 72.

It may thus be seen that the two inputs 60 and 62 to the comparator 26 will receive analog signals and the signals will be related to the same channel. The signal on the second input 62 will be a known analog voltage equal to the digital set point signal or will be increasing or decreasing therefrom at a known rate. The signal on the first input 60, however, will be an unknown analog voltage having an amplitude which corresponds to the actual magnitude of the function at that particular instant. The comparator 26 will be effective to compare these two analog voltages and determine the difference, if any, therebetween. If the unknown signal is higher than the known signal, i.e., the actual magnitude of the function is too high, a signal will be provided on the first output 64. However, if the unknown signal on the input 60 is higher than the known signal, i.e., the function is too high, a signal will be provided on the second output 66.

These two outputs 64 and 66 are interconnected with a counter control 76 which, in turn, is interconnected with the add and substract inputs 36 and 38, respectively, to the counter 22. The counter control 76 may be a conventional control circuit. It is interconnected with the master clock 48 and the scanner control 46 so that the add and substract signals from the outputs 64 and 66 and the clock pulses will be switched or gated into the counter 22 in synchronism with the intervals when the set point signal is fed to the output 31 and the function signal for the same channel is present on the output 72.

It may thus be seen that a closed loop is formed. When the scanner control 46 switches a control unit 14 for a particular channel to the input 30, a digital set point signal will be fed to the conuter 22. At the same time, the function signal for the same channel will be fed to the first input 60 of the comparator 26. The set point signal will be converted to an analog signal and fed to the second input 62 of the comparator 26. The two signals will then be compared to produce a difference signal on the output 64 if the function is too high or on the output 66 if it is too low. This signal will then be fed through the counter control 76 to the input 36 or input 38, respectively, of the counter 22.

The counter 22 will then proceed to add or subtract a count to the set point signal each time a clock pulse is fed to the input 40. Each time the signal is changed as a result of this counting, the resultant signal on the output 32 will be one count closer to the actual value of the function. The variations in this resultant signal will, in turn, cause the amplitude of the known voltage on the input 62 to approach the amplitude of the unknown voltage on input 60. As the amplitudes of the two signals gradually approach each other, the difference signal on the output 64 or 66 will decrease and when the two signals on inputs 60 and 62 are equal to each other, the difference signal will disappear. When this occurs, all of the signals on the inputs 36 and 38 will disappear. The counter will then stop adding or subtracting any counts to the set point signal and the entire loop will then be stabilized with the signals on inputs 60 and 62 equal.

During the adding and subtracting process, each time that a clock pulse on the input 40 causes a pulse to be added or subtracted, a counting pulse will be produced on the output 34. A pulse train will thus be produced on the output 34 having a frequency equal to the clock rate and the number of pulses in the train will be equal to the original difference between the set point signal and the function signal. It may thus be seen that the number of the pulses or the duration of the pulse train will be a measure of the amount of error present between the actual value of the function and the value that it should be.

The signal means or pulse shaper 28 may be of a substantially conventional design. In the present instance, it includes a signal input 78, a pair of polarity inputs 80 and 82, and a single output 84. The first or signal input 78 is adapted to receive a series of pulses and produce an output signal suitable for actuating the output modules 18 in proportion to the pulses over a corresponding pulse train on the output. By way of example, the pulse shaper may be of the integrating variety that will integrate the pulses and produce a sawtooth type of output signal that will reach a maximum peak proportional to the number of pulses in the series. If this form of pulse shaper is employed, a reset input 86 may be interconnected with the scanner control whereby the shaper 28 will always be cleared to zero at the beginning of each series of pulses.

Alternatively, the pulse shaper 28 will be effective to produce a pulse on the output 84 each time that a pulse is applied to the input 78. All of the pulses on the output will be of a predetermined shape, i.e., amplitude and time duration. Depending upon the type of output modules 18 employed, these output pulses may be pulses of voltage. However, it the output modules 18 are of the type disclosed and claimed in said copending application Ser. No. 310,227, the pulses may be pulses of current. It may thus be seen that each of the output pulses will produce some amount of actuation of the output module.

The polarity inputs will not be capable of in any way altering the shape of the output pulses. However, if a signal is present on the first input 80, the pulses from the output will be of one polarity, for example, positive, and if a signal is present on the second input 82, the pulses will be of another polarity, for example, negative.

In the present instance, the signal input 78 is connected to a pulse output 34 from the counter 22 so as to receive the pulses in the error signal. Each time one of the pulses is fed to the input, a pulse of predetermined shape will be produced at the output 84.

The first polarity input 80 is connected to the add output 64 from the voltage comparator while the second input 82 is connected to the subtract output 66. It may thus be seen that when an error signal is generated in the counter 22, a similar pulse train will be produced at the output 84. In the event that the error signal is being produced as a result of the function signal being too high, an add signal will be present on the output 64. In addition to being fed to the counter 22 so as to cause it to operate in the add mode, the signal will also be fed into the input 80 of the shaper 28. This will cause the output signals to be of a polarity such as positive. If the error signal is produced as a result of the function signal being too low, a subtract signal will be present on the output 66. In addition to being fed to the counter 22 so as to cause it to operate in the subtract mode, this signal will also be fed into the input 82 of the shaper 28 whereby the output signals will be of a second polarity.

Since time sharing multiplex is employed in the present instance, an output scanner 88 is provided for interconnecting the various output modules 18 with the pulse shaper 28. The output scanner 88 includes a single signal input 90, a control input 92 and a separate output 94A to 94P for each of the functions or channels A to P. The output scanner 88 is the converse of the input scanner 68 and, accordingly, the control input 92 is adapted to sequentially interconnect the input 90 with the successive outputs 94.

The signal input 90 is connected to the output 84 from the pulse shaper 28 so as to receive the error signal consisting of the shaped pulses. The control input 92 for the scanner 88 is interconnected with the output of the scanner control 46 whereby the control signal will be synchronized with the control signals fed to the input scanner 68 and the scanner in the control panel 12. This will be effective to insure the output 84 from the shaper 28 being interconnected with the outputs 94 in the same sequence and same time intervals as the inputs 30 and 60.

Each of the outputs 94 from the scanner 88 may be connected directly to a controller or regulator that is effective to vary the magnitude of its respective function. Most of the controllers and/or regulators presently available are particularly adapted to respond to analog signals. Accordingly, if the signals from the outputs 94 are of a digital variety, each of the outputs 94 may be connected to an output module 18 that will convert the digital signal to an analog signal. The modules 18 may be of any desired variety such as a conventional digital-to-analog converter. Alternatively, they may be similar to the converter disclosed and claimed in said copending application Ser. No. 310,227 (now Patent 3,290,673 issued Dec. 6, 1966).

In order to employ the present system 10 for monitoring and/or controlling a large number of interrelated functions such as an industrial process, a pickup is provided for each of the functions. Each of these pickups includes a transducer which will continuously produce a signal proportional to the magnitude of the function. Each of the transducers is operatively interconnected with the input 70 of scanner 68 for the channel corresponding to the function. This will insure each of the unknown function signals being continuously present on the various inputs 70A to 70P to the scanner 68. Each of these signals will be of the analog variety and will have an instantaneous amplitude that is proportional to the magnitude of the function at that instant.

At the same time, each of the outputs 94A to 94P from the output scanner 88 may be interconnected with the output module 18A to 18P associated with the corresponding function. This output module 18 may be effective to control the functions directly. However, since the signals from the outputs 94 will normally be of the digital variety, the modules 18 will normally be effective to convert the digital signal to an analog signal and will be interconnected with a suitable controller or regulator.

Each of the control units 14 in the control panel 12 may then be manually adjusted so that each of the dials 16 will present a reading that indicates the value at which the function is to be maintained. This will be effective to cause each of the control units 14 to produce set point signals in a digital form and having a magnitude corresponding to the setting on the dials 16. After the system 10 has been properly set up in the foregoing manner, the control system 10 may be turned on and the process to be monitored and/or controlled may be started. The scanner control 46 will then, in a time-sharing sequence, interconnect the output 72 of the scanner 68 with the successive pickups. The output 72 will then carry a sequence of analog signals with each of the signals in the sequence representing the magnitude of one of the functions. At the same time, the scanner control 46 will synchronously switch the corresponding control unit 14 in the control panel to the input 30 of the counter 22 and the input 90 of the output scanner 88 with the corresponding output module 18.

The set point signal fed from the control panel 14 to the counter 22 will be a digital signal having an amplitude that corresponds to the magnitude of the setting on the dial 16 and at which that particular function should be maintained. The digital set point signal will flow through the counter 22 to the output 32. Initially, the signal on the output 32 of the counter will have the same magnitude as the set point signal. The signal will then flow to and through the digital-to-analog converter 24 where it will be changed to an analog signal. The resultant known signal will have an amplitude that corresponds to the magnitude of the digital signal and initially will be equal to the set point value. The known analog signal will then be applied to the second input 62 of the comparator 26. At the same time, the unknown function signal will be applied to the first input 60. The comparator 26 will then compare the known signal and unknown signal. If the magnitude of the function is equal to the desired value, the two signals will be equal and there will be no signals on either of the outputs 64 or 66. As a result, no signal will be fed to the counter 22 and the counter 22 will not feed an error signal to the pulse shaper 28. This, in turn, will not cause any changes or adjustments in the function.

However, if the function is too high, the signal on input 60 will initially exceed the signal on input 62 and there will be an add signal on the output 64. This signal will pass through the counter control 76 and each time that a clock pulse occurs the counter 22 will add one count or unit to the signal on the output 32. The increased signal will then be converted in the converter 24 to an analog signal of equivalent amplitude and fed to the input 62. The known signal or input 62 of increased value will then be recompared with the unknown signal or input 60. If the unknown function signal is still higher, there will still be a signal present on output 64 and applied to the add input 36. This comparing and adding process will be repeated again and again, until the unknown and known signals on inputs 60 and 62 become of equal amplitude and there are no signals on either of the outputs 64 and 66.

It may be seen that the number of times a count is added to the set point signal to raise it to the amplitude of the unknown function signals will be equal to the difference that originally existed. In other words, the number of counts added will be equal to the amount of error existing between the function and the set point.

Each time that a count is added to the set point signal, a counting pulse will be produced on the output 34 of the counter 22 and fed to the input 78 of the pulse shaper 28. The number of these pulses will, of course, be equal to the original error. Each time that a pulse is fed to the input 78, a pulse will be fed from the output 84 of the shaper 28 to the input 90 of the scanner 88. The amplitude and duration of each of these pulses will be precisely determined by the shaper 88. Since the function signal on input 60 exceeds the known signal or input 62, there will be an add signal on the output 64 and on the polarity input 80 whereby the pulses will be of a particular polarity such as positive. The shaped error signals will then be fed into the input 90 of the output scanner 88. The scanner control 46 will have set the scanner 88 so that the error signal will be fed to the output module corresponding to the function selected at the control panel and input scanner. The error signal which is in digital form will be converted to an analog error signal in the output module. The error signal will then actuate a suitable regulator or control so as to modify the magnitude of the function by an amount proportional to the amplitude of the analog error signal. This will be effective to insure the function being decreased by the amount of the error so as to be restored to the magnitude represented by the set point signal provided at the output of the control panel.

It should be noted that in the present system the dials 16 are shown as having three digits. Since the system 10 can only count by one of these units, the system will only be able to reduce the error in the function to one part in 1,000, i.e., 0.1%. If it is desired to increase the accuracy of the system 10, a larger number of digits may be employed. This greatly increases the complexity and cost of the system. However, the amount of error can be cut in half by providing a half add output 96. This will permit the counter 22 to add or count in half units. As a result, the system 10 will be able to balance out any errors to a half unit or 0.5 unit in 1,000, i.e., 0.05%.

In the event that the function signal is lower than it should be, the unknown function signal on the first input 60 will be less than the known set point signal on the second input 62. This difference signal will be fed through the subtract input 38 into the counter 22. This will cause the counter 22 to subtract from the set point signal whereby the known signal on input 62 will be decreased until it equals the unknown signal on input 60. At the same time, the pulse train on output 34 forming the error signal will travel from the output 34 to the input 78 of the pulse shaper 28. The pulse shaper 28 will then produce a series of signals and feed them to the input 90 of the scanner 88. However, under these circumstances, there is a signal present on the polarity input 82. This will cause the pulses from the shaper 28 to be of opposite polarity, for example, negative. The analog signal produced by the output module will thus be effective to vary the function to increase it by an amount equal to the error.

It may be seen that the foregoing system 10 will be effective to maintain all of the functions at the same value selected by the setting of the dials 16. However, it may be desirable for an operator to monitor the operation of the process. In this event, a display panel 98 may be provided. This panel 98 includes a channel indicator 100, a selector indicator 102 and a value indicator 104. These indicators may be of any desired variety suitable for producing a visual display of the desired indicia. The indicator 104 may be interconnected with the output 32 of the counter 22 so as to receive the signals therefrom. The panel 98 is also connected with the scanner control 46 which is effective to control the instant when the signal is transferred from the output 32 to the indicator 104. By setting the channel selector 106 to the desired channel A to P, the scanner control 46 will be effective to cause a corresponding indicia or number to be displayed by indicator 100. Also, it will cause the signal from output 32 to be transferred into the indicator 104 during the interval when the control unit 14A to 14P corresponding thereto is connected to input 30. If the selector 108 is at the set point position, the S.P. indicator 102 will be displayed and the signal from output 32 will be transferred before any counts are added thereto. Thus, the value of the set point will be displayed. If the selector 108 is set to the variable position, the signal from output 32 will not be transferred until enough counts have been added thereto to balance the signals on the inputs 60 and 62. As a result, the VAR in indicator 102 will be displayed and the indicator 104 will desplay the magnitude of the function.

While only a single embodiment of the present invention is disclosed and described herein, it will be readily apparent to persons skilled in the art that numerous changes and modifications may be made thereto without departing from the scope of the invention. Accordingly, the foregoing disclosure and description thereof are for illustrative purposes only and do not in any way limit the invention which is defined only by the claims which follow.

What is claimed is:

1. Apparatus for regulating a variable output in accordance with the value of a reference, including:
   means for providing a signal with characteristics variable in accordance with the variable output,
   means for providing a reference signal having characteristics representing the reference value,
   counter means having a reference input for receiving said reference signal and a control input for receiving a command signal to count consecutively in particular increments from a particular value represented by said reference signal in accordance with the characteristics of said command signal, the counter having an output, and
   comparator means having a pair of inputs and an output to compare the signals on the two inputs and to provide a difference signal on said output in accordance with such comparison, the output of said comparator being interconnected with the control input to said counter so that the difference signal will provide the command signal for causing said counter to count in the particular increments from said reference value in accordance with the characteristics of said command signal,
   one of the inputs to said comparator being interconnected with said output of said counter and the other of said inputs being interconnected with the variable signal means.

2. The apparatus set forth in claim 1 wherein a plurality of variable outputs are provided and a plurality of variable signal means are provided to produce a plurality of variable signals and wherein a plurality of reference signal means are provided to produce a plurality of reference signals and wherein the variable signal means in the plurality and the reference signal means in the plurality are multiplexed to provide for the introduction of individual ones of the variable signals to the counter means and to provide for the introduction of individual ones of the reference signals to the comparator means and wherein the command signals from the comparator means are multiplexed to introduce the command signals to individual ones of the variable outputs in the plurality.

3. Apparatus for regulating a variable output in accordance with the value of a reference, including:
   means for providing signals having variable characteristics in accordance with variations in the variable output,
   means for providing a reference signal having characteristics representing the value of the reference,
   counter means having a reference input for receiving said reference signal and having a control input for receiving command signals and having a pair of outputs to count consecutively in particular increments from a particular value represented by said reference signal in accordance with the introduction of the command signals,
   comparator means having a pair of inputs and an output,
   one of the inputs to said comparator means being interconnected with said first output from said counter means and the other of said inputs to said comparator means being connected to said variable signal means to receive said variable signals,
   said comparator means being constructed to compare the signals on the two inputs and to provide a difference signal on said output in accordance with such comparison, the output of said comparator means being interconnected with the control input to said counter means to introduce the difference signal from the comparator means to the control input of the counter means as the command signal,
   the second output from said counter being connected to the variable output to vary such output in accordance with the characteristics of such signal on the second output.

4. The apparatus set forth in claim 3 wherein the variable signal means provides the variable signals in analog form and wherein the reference signal means provides the reference signal in digital form and wherein the counter means provides a digital output and includes a digital-toanalog converter for converting the count from the counter means into an analog form and wherein the comparator means compares the count in analog form from the analog-to-digital converter and the variable signals in analog form.

5. Apparatus for regulating a variable ouptut in accordance with the value of a reference, including:
 means for providing a signal having variable characteristics in accordance with variations in the variable output,
 means for providing a reference signal having characteristics representing the value of the reference,
 counter means having an output,
 a reference input to said counter means, the reference input being interconnected with said reference signal means to receive said reference signal,
 a control input to said counter means for receiving command signals,
 said counter means being constructed to count from a value represented by said reference signal in particular increments in accordance with the characteristics of the command signals,
 comparator means having a pair of inputs and an output, said comparator means being constructed to compare the signals on the two inputs and to provide a difference signal on said output in accordance with such comparison,
 one of the inputs to said comparator means being interconnected with said output of said counter means and the other of said inputs being interconnected with said variable signal means,
 means interconnecting the output of said comparator means with the control input to said counter means to provide said difference signal as the command signal to the control input of said counter means, and
 means interconnecting the output of said comparator means with said variable output to vary said variable output in accordance with the characteristics of said difference signal from said comparator means.

6. The apparatus set forth in claim 5 wherein a plurality of variable outputs are provided and wherein a plurality of variable signal means are provided and wherein a plurality of reference signal means are provided and wherein the variable outputs in the plurality, the variable signal means in the plurality and the reference signal means in the plurality are multiplexed to provide for the introduction of individual ones of the reference signals to the counter means, individual ones of the variable signals to the comparator means and the command signals from the comparator means to individual ones of the variable outputs.

7. Apparatus for regulating a variable input in accordance with the value of a reference, including:
 means for providing a signal having variable characteristics in accordance with variations in the variable output,
 means for providing a reference signal having characteristics representing the value of the reference,
 counter means having an output,
 a reference input to said counter means, the reference input being interconnected with said reference signal means to receive said reference signal,
 a control input to said counter means for receiving command signals, said counter means being constructed to count from a value represented by said reference signal consecutively in particular increments in accordance with the characteristics of said command signals to provide on the output of said counter signals having characteristics representing such count,
 comparator means having a pair of inputs and an output, said comparator means being constructed to compare the signals on the two inputs and to provide difference signals on said output in accordance with such comparison,
 one of the inputs to said comparator means being interconnected with the output of said counter means to receive said signals representing the count from the counter means and the other of said inputs being interconnected with said variable signal means,
 means interconnecting the output of said comparator means with the control input to said counter means to provide the difference signals from the comparator means as the command signals to the control input of the counter means,
 means for periodically providing clock signals and for introducing the clock signals to the counter means to periodically obtain the variations in the count from the counter means in accordance with the production of the clock signals, and
 means connected to the comparator means for introducing the difference signals from the comparator means to the variable output to obtain variations in such output in accordance with the characteristics of the difference signals.

8. The apparatus set forth in claim 7 wherein the variable signal means provide the variable signals in analog form and the reference means provide the reference signal in digital form and wherein the counter means provide the count in digital form and include a digital-to-analog converter for converting the count from the counter into analog form and wherein the comparator means compare the count in analog form from the digital-to-analog converter with the variable signals in analog form.

9. The apparatus set forth in claim 8 wherein a plurality of variable outputs are provided and a plurality of variable signal means are provided and a plurality of reference signal means are provided and the variable outputs in the plurality, the variable signal means in the plurality and the reference signal means in the plurality are multiplexed and wherein the reference signals from the multiplexed reference signal means in the plurality are introduced to the counter means and the variable signals from the multiplexed variable signal means in the plurality are introduced to the comparator means and the command signals from the comparator means are introduced to the multiplexed variable outputs in the plurality.

10. Apparatus for regulating a variable output in accordance with the value of a reference, including,
 means for providing a signal having variable characteristics in accordance with variations in the variable output,
 means for providing a reference signal having characteristics representing the value of the reference,
 clock means for periodically producing clock signals,
 counter means,
 a reference input to said counter means, the reference input being interconnected with said reference signal means to receive said reference signal,
 a control input to said counter means for receiving a command signal,
 a clock input to said counter means for receiving said clock signals from said clock means to cause said counter means to count consecutively in particular increments in a positive and negative direction from a value represented by said reference signal in accordance with the characteristics of the command signals each time that a clock signal occurs and to provide output signals representing said count,
 comparator means having a pair of inputs and an output, said comparator means being constructed to compare the signals on one of the two inputs with the signals on the other of the two inputs and to provide on said output a difference signal having characteristics representing the polarity of such difference,
 one of the inputs to said comparator means being interconnected with said output of said counter means to receive said counting signals from said counter means and the other of said inputs to said comparator means being interconnected with said variable signal means, means interconnecting the output of said comparator means with the control input to said counter means to introduce the difference signals to said control input as the command signals, and means connected to the output from said comparator means to introduce the difference signals from said comparator means to said variable output to vary the variable output in accordance with the characteristics of said difference signals.

11. Apparatus for regulating a variable output in accordance with the value of a reference, including:

means for providing a signal having variable characteristics in accordance with variations in the variable output, means for providing a reference signal having characteristics representing the value of the reference, counter means having a reference input for receiving said reference signal, a first input to said counter means for receiving an add signal and consecutively adding particular increments to a reference value representing said reference signal only when an add signal is present on said input, a second input to said counter means for receiving a subtract signal and consecutively subtracting the particular increments from the reference value representing said reference signal only when a subtract signal is present on said second input, said counter means having an output which produces signals having characteristics representing the count from the counter means, comparator means having a pair of signal inputs and an add output and a subtract output, said comparator means being constructed to compare the signals on the two inputs and to provide add signals on said add output when the value represented by the signal on the first signal input is greater than the value represented by the signal on the second signal input in said pair, said add output being interconnected with the first input to said counter means to introduce the add signal to the first input, said comparator means further being constructed to provide subtract signals on said subtract output when the value represented by the signal on the second signal input is greater than the value represented by the signal on the first signal input, said subtract output of said comparator means being interconnected with the second input to said counter means to introduce the subtract signals to the second input, means for introducing the output signals from the counter means to the first signal input to the comparator means, means for introducing the variable signals from the variable signal means to the second signal input to the comparator means, and means connecting the add and subtract outputs from said comparator means to the variable output to vary the variable output in accordance with the production of signals on the add and subtract outputs.

12. Apparatus for regulating a variable output in accordance with the value of a reference, including:

means for providing a signal having variable characteristics in accordance with variations in the variable output, means for providing a reference signal having characteristics representing the value of the reference, counter means having an output for providing counting signals having characteristics representing the count in the counter means, a reference input to said counter means, the reference input being interconnected with said reference signal means to receive said reference signal, an add input to said counter means for receiving an add signal, said counter means being constructed to add counts in particular increments to a value represented by said reference signal during the presence of an add signal on said add input, a substract input to said counter means for receiving a subtract signal, said counter means being constructed to subtract counts in the particular increments from the value represented by said reference signal during the presence of a subtract signal on said subtract input, comparator means having a pair of signal inputs and an add output and a subtract output, said comparator means being constructed to compare the signals on the two inputs and to provide an add signal on said add output when the value represented by the signal on one of the signal inputs is greater than the value represented by the signal on the other signal input and to provide a subtract signal on the subtract output when the value represented by the signal on the other signal input is greater than the value represented by the signal on the one signal input, one of the signal inputs to said comparator means being interconnected with said output of said counter means to receive said counting signals and the other of the signal inputs to said comparator means being interconnected with the variable signal means to receive the variable signals, means interconnecting the add output of said comparator means with the add input to said counter means to cause said counter means to add counts to the value represented by said reference signal until said add signal is not produced, and means interconnecting said subtract output of said comparator means to said subtract input of said counter means to cause said counter means to subtract counts from said value represented by reference signal until said subtract signal is not produced.

13. The apparatus set forth in claim 12 wherein the variable signal means provide the variable signals in analog form and wherein the reference signal means provide the reference signal in digital form and wherein the counter means provide the count in digital form and include a digital-to-analog converter for converting the digital count into analog form and wherein the comparator means receive the signals in analog form from the digital-to-analog converter and the variable signals.

14. Apparatus for regulating a variable output in accordance with the value of a reference, including:

means for providing a signal having variable characteristics in accordance with variations in the variable output, means for providing a reference signal having characteristics representing the value of the reference, clock means for periodically producing clock signals, counter means having an output, a reference input to said counter means, the reference input being interconnected with said reference signal means to receive said reference signal, an add input to said counter means for receiving an add signal, said counter means being constructed to add counts in particular increments to said value represented by the reference signal during the occurrence of an add signal on said add input and the simultaneous production of the clock signals to produce counting signals on the output of said counter means, a subtract input to said counter means for receiving a subtract signal, said counter means being constructed to subtract counts in the particular increments from the value represented by said reference signal during the occurrence of a subtract signal on said subtract input and the simultaneous production of the clock signals to produce counting signals on said output of said counter means, comparator means having a pair of signal inputs for receiving signals and an add output and a subtract output, said comparator means being constructed to compare the values represented by the signals on the two signal inputs and to provide an add signal on said add output when the value represented by the signal on the first signal input is larger than the value represented by the signal on the second signal input and to provide a subtract signal on said subtract output when the value represented by the signal on the second signal input is larger than the value represented by the signal on the first signal input, one of the inputs to said comparator means being interconnected with said output of said counter to receive said counting signals and the other of said inputs to said comparator means being interconnected with said variable signal means, means interconnecting the add output of said comparator means with the add input to said counter means to introduce said add signals from said comparator means to said counter means to add counts to said value represented by said reference signal until said add signals are no longer produced, means interconnecting the subtract output of said comparator means with the subtract input to said counter means to introduce said subtract signals from said comparator means to said counter means to subtract counts from said value represented by reference signal until said subtract signals are no longer produced, and means connected to said add and subtract outputs of said comparator means for introducing said add and subtract outputs to said variable output to vary said variable output to vary said variable output in accordance with said add and subtract outputs.

15. The apparatus set forth in claim 14 wherein a plurality of reference signal means are provided and a plurality of variable signal means are provided and wherein means are provided for multiplexing the signals from the reference signal means and introducing the multiplexed signals into the counter means and wherein means are provided for multiplexing the signals from the variable signal means and for introducing such multiplexed signals into the comparator means and wherein means are provided for multiplexing the add and subtract signals from the counter means and for introducing such multiplexed signals to individual ones of the variable outputs in the plurality.

References Cited

UNITED STATES PATENTS

| | | | |
|---|---|---|---|
| 2,928,033 | 3/1960 | Abbott. | |
| 3,196,262 | 7/1965 | Thompson | 235—177 |
| 3,201,572 | 8/1965 | Yetter | 235—151 |
| 3,211,976 | 10/1965 | Brule et al. | |

MALCOLM A. MORRISON, *Primary Examiner.*

MARTIN P. HARTMAN, *Examiner.*